United States Patent [19]

Gopal et al.

[11] Patent Number: 4,748,658
[45] Date of Patent: May 31, 1988

[54] ARCHITECTURE FOR ALLOCATING RESOURCES IN A TELECOMMUNICATIONS NETWORK

[75] Inventors: Gita Gopal, East Rutherford; Abel Weinrib, Randolph, both of N.J.

[73] Assignee: Bell Communications Research, Inc., Livingston, N.J.

[21] Appl. No.: 886,515

[22] Filed: Jul. 16, 1986

[51] Int. Cl.[4] .............................................. H04M 7/06
[52] U.S. Cl. ..................................... 379/221; 379/229
[58] Field of Search .............. 379/220, 221, 225, 230, 379/113, 229; 370/54, 86, 89, 90

[56] References Cited

U.S. PATENT DOCUMENTS

3,591,724 7/1971 Yaku et al. ........................ 379/221 X
4,704,724 11/1987 Krishnan et al. .................... 379/221

OTHER PUBLICATIONS

"Design and Optimization of Networks with Dynamic Routing", *Bell System Technical Journal*, G. R. Ash, et al., vol. 60, pp. 1787–1820, Oct. 1981.
"A Simulation Study of Advanced Routing Methods in a Multipriority Telephone Network", B. Akselrod et al., *IEEE Trans Systems, Man and Cybernetics*, vol. SMC 15, No. 6, Nov./Dec. 1985.
"Network Control System Using Traffic Databases", Proc., Int. Conf. on Communications, K. Mase et al., 1982.
"Advanced Traffic Routing in Local Telephone Networks; Performance of Proposed Call Algorithms", *Ninth Int. Teletraffic Congress*, Torrelmolinos, Spain, E. Szybicki et al., Oct. 1979.
"Use of a Trunk Status Map for Real Time DNHR", Proc. Eleventh Int. Teletraffic Congress, G. R. Ash, Kyoto, Sep. 1985.
B. R. Hurley et al.; "A Survey of Dynamic Routing Methods for Circuit-Switched Traffic", IEEE Communications Magazine, vol. 25, No. 9, pp. 13–21.

*Primary Examiner*—James L. Dwyer
*Attorney, Agent, or Firm*—James W. Falk

[57] ABSTRACT

A control network for allocating resources (i.e. making routing decisions) in an associated telecommunications network is disclosed. Illustratively, the control network comprises a group of processors arranged in a ring. A database containing information about the exact state of the telecommunications network circulates in a ring-like control network. When an originating switching office in the telecommuncations network wishes to set-up a connection, it seizes one of the processors in the control network and informs it of the desired connection. The processor runs a call set-up algorithm utilizing the database and makes a routing decision which is communicated back to the originating switching office. The originating central office then physically sets up the call in the telecommunications network.

14 Claims, 2 Drawing Sheets

ACCESS POINT

| | # TRUNKS IN USE | # TRUNKS IN GROUP | GROUP ID |

QUEUE OF ALLOCATION REQUESTS

ARCHITECTURE FOR ALLOCATING RESOURCES IN A TELECOMMUNICATIONS NETWORK

FIELD OF THE INVENTION

This invention relates to an architecture for allocating resources in a large network, for example, the allocation of trunks in a public telephone network.

BACKGROUND OF THE INVENTION

A telecommunications network typically comprises a group of switching offices interconnected by trunk groups. Each office may comprise a switch operating under the control of a stored program processor for establishing connections between incoming and outgoing trunk groups. Setting up a call in the network typically involves establishing a connection between an originating switching office and a destination switching office. Depending on the state of the network (i.e., the level of congestion in particular trunk groups) the route from the originating switching office to the destination switching office may be direct, or it may be a multi-hop route, passing through one or more intermediate switching offices.

Initially routing in the U.S. public telephone network was handled by human operators. Later, advances in electromechanical, common control, switch technology permitted replacement of the human operators with automated routing. The resulting problems with network congestion were addressed in stored program controlled switching machines such as the #4 ESS and through the use of more sophisticated routing strategies to be implemented by software within the switching offices. Thus, the routing algorithms became more flexible (e.g., capable of changing with the time of day) and more accessible to modification. In addition, switching office machines could be used to collect data about the state of the network and implement internal overload controls. In the 1970's improvements in communications technologies in the form of common channel signaling helped alleviate overload problems by reducing the holding time of network resources in failing call attempts and generally permitting a more flexible and rapid dissemination of information about call attempts through the network. Various strategies have been used by central switching offices to chose particular routes for calls in the telephone network. One such strategy is known as Dynamic Non-Hierarchical Routing (DNHR) (see for example G. R. Ash et al "Design and Optimization of Networks with Dynamic Routing" Bell System Technical Journal Vol 60, pp 1787–1820, October 1981). DNHR is preplanned routing, defined statically at the time the network is engineered. More particularly, in DNHR each switching office maintains a list of possible routes between it and other switching offices in the network. Thus, when switching office A wants to establish a connection with switching office B, switching office A will test the list of possible routes between switching office A and switching office B, until an available route is found. If none of the routes in the list is available, the call will be blocked. The list of routes between any pair of switching offices, such as switching offices A and B mentioned above, is ordered so that network resources are used most efficiently. For example, first the direct route between switching offices A and B is tested, then routes having one intermediate switching office, etc.

The ordering of routes in the list may change at different times in the day to reflect different network conditions. In this sense, the DNHR scheme is dynamic. However, the lists of routes maintained in each central switching office and changes in the lists at particular times are statically engineered into the network when it is built. Thus, the DNHR scheme is not dynamic in the sense that information about the state of the network is not dynamically provided to each switching office so that routing decisions can be made based on the actual state of the network at the time of call set-up.

Other more sophisticated routing schemes have been suggested in which some global information is maintained about the state of the network. (See for example B. Akselrod et al "A Simulation Study of Advances Routing Methods in a Multipriority Telephone Network" IEEE Trans-Systems, Man and Cybernetics Vol, SMC 15, No. 6, November-December 1985, K. Mase et al "Network Control Using Traffic Databases" Proc., Int. Conf. on Communications, 1982, E. Szybicki et al, "Routing in Local Telephone Networks. Performance of proposed Call Algorithms" Ninth Int. Teletraffic Congress Torremolinos, Spain October 1979, G. R. Ash "Use of a Trunk Status Map for Real Time DNHR" Proc. Eleventh Int. Teletraffic Congress Kyoto, September 1985) For example, to complete a call, routes are tested in an order determined by dynamically varying probabilities calculated using the estimated global information about the state of the network. Databases containing the estimated global information may be maintained centrally or in a distributed manner. Unless these databases are updated frequently, so that they can track the network state very closely, it is possible that these algorithms may actually perform worse than the statically defined routing scheme discussed above.

In addition, in all of the above schemes, routes are tried sequentially and some trunks in a route may be held by a call, while other trunks comprising the route are being obtained. Thus, a call, which eventually gets blocked due to the unavailability of a particular trunk in a route, may have held onto other trunks and switching resources unnecessarily. This may be particularly significant during overload situations.

One other routing scheme worth mentioning evaluates future blocking estimate factors for various routes based on past and present network states, as well as estimates or future traffic blocking (see Krishnan and Ott U.S. Pat. No. 4,704,724, issued Nov. 3, 1987 filed on Dec. 5, 1985 and assigned to the Assignee hereof). These factors serve to determine which route to use and also indicate when calls should be blocked even though a route may be available, since blocking the call may be the best strategy to optimize overall network performance.

It is an object of the present invention to provide an architecture for controlling the allocation of network resources, so that routing decisions can be made efficiently. More particularly, it is an object of the present invention to provide a network control architecture for controlling the allocation of network resources and which permits routing decisions to be based on a substantially exact knowledge of the state of the network, at the time the routing decision is made.

SUMMARY OF THE INVENTION

The present invention is a control network for allocating resources in an associated telecommunications network. Illustratively, the telecommunications network comprises a plurality of switching nodes or offices interconnected by trunk groups.

The telecommunications network is controlled using a database which contains a complete representation of the current number of busy trunks in each trunk group. The database comprises one record for each trunk group, and each record contains current information concerning the free capacity of a particular trunk group.

The database circulates in a control network which comprises a group of processors arranged in a ring. Thus, the processors can see the records in the database as they pass by. More particularly, the records in the database are shifted through delay buffers at access points on the ring. A processor reads a records as soon as it enters the delay buffer and a processor can write into the record as it leaves the delay buffer. The intervening delay allows the processor time to execute algorithms relating to call set-up and tear down.

To set up a call, the originating switching office in the telecommunication network seizes one of the processors in the control network. A list of possible paths for the calls is made available to the seized processor, and the processor selects the best route by executing a call set-up algorithm (to be discussed below). The call set-up algorithm uses the complete representation of the number of busy trunks in each trunk group contained in the circulating database. As part of the call set-up algorithm, the database is also updated so that it knows what resources (i.e. what trunk groups) have been allocated to the newly set-up call. When a route has been allocated in the database, the processor in the control network informs the originating central office in the telecommunications network of the choice, so that the originating central office can physically set up the call. At call completion the originating central office communicates with a processor in the control network ring to update the database so that the database knows which trunks have been released. In this way, the database is always consistent with the current state of the network.

It is an important advantage of the invention that telecommunications network resources are not allocated until a processor in the control network has successfully found a route for the call. Thus, the contention for shared resources is resolved in the control network rather than in the telecommunications network itself, to reduce the time that resources are held while setting-up calls which eventually are blocked.

DETAILED DESCRIPTION

Figure 1:
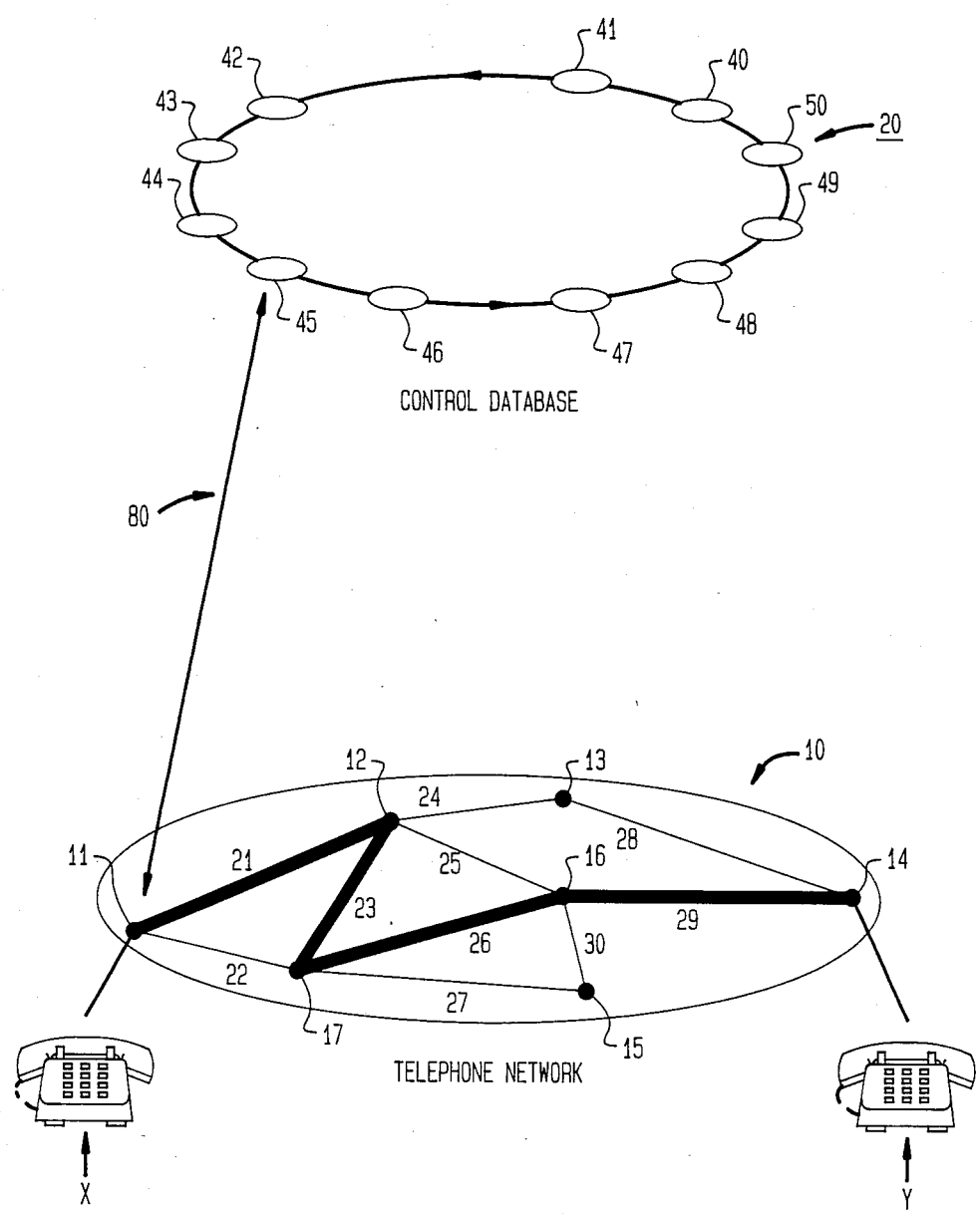
FIG. 1 illustrates a control network for allocating resources in a telecommunications network in accordance with an illustrative embodiment of the invention.

Turning to FIG. 1, a telecommunications network 10 and a control network 20, for allocating resources in the telecommunications network 10 are schematically illustrated.

The telecommunications network 10 comprises a plurality of switching offices 11, 12, 13, 14, 15, 16, 17 and a plurality of trunk groups 21-30 interconnecting the switching offices. Each trunk group comprises a plurality of trunk lines. If telephone user X wishes to talk to telephone user Y, the originating switching office 11 associated with user X must set up a route through the network 10 to the destination switching office 14 associated with user Y. An example of such a path is illustrated by the bold lines in FIG. 1. This route utilizes trunk groups 21, 23, 26, 29 and passes through intermediate switching offices 12, 17 and 16. Illustratively, each of the switching offices 11-17 is a conventional stored program controlled switching machine with the capability of transmitting information to and receiving information from the control network 20.

Figures 2, 3:
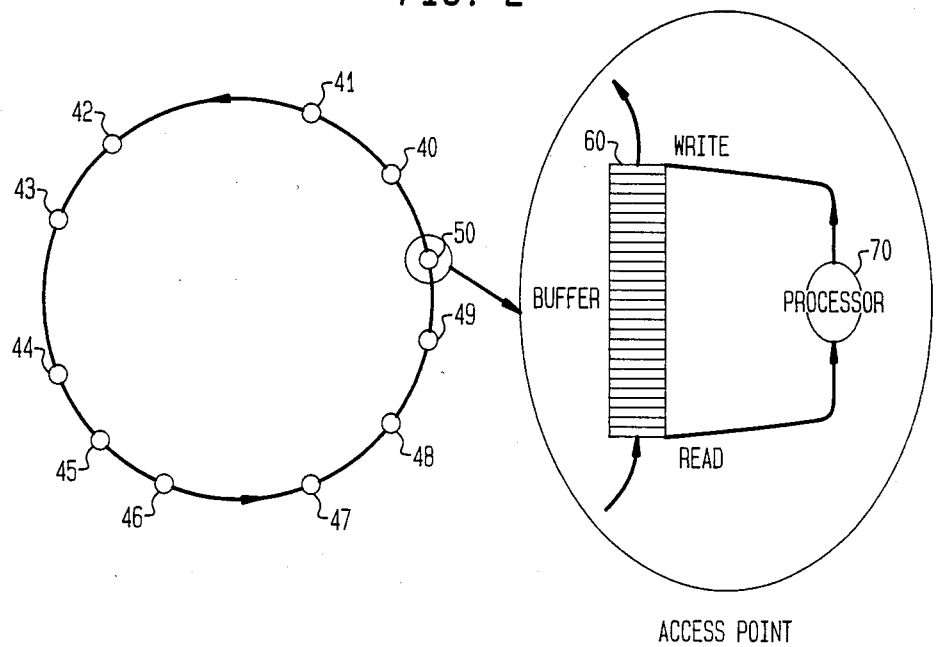
FIG. 2 illustrates an access point in the control network of FIG. 1.
FIG. 3 illustrates the format of one record of a data base maintained in the control network of FIG. 1.

As indicated previously, the present invention utilizes the control network 20 to efficiently set up routes between the switching offices in the telecommunications network 10. Illustratively, control network 20 is a ring network having a plurality of access points 40, 41, 42, 43, 44, 45, 46, 47, 48, 49, 50. Illustratively, as shown in FIG. 2, each access point comprises a delay buffer 60 and a processor 70, which processor may be a conventional stored program computing machine.

Illustratively, the individual access points 40-50 could all be located at a central location. However, with the broad inter-office communications band widths which become available with the deployment of optical fiber technology, the access points 40-50 could be spread out over a large geographic region. For example, each switching office in the telecommunications network 10 may contain one or more of the access points comprising the control network 20. Thus, a switching office in the telecommunications network 10 may include one or more associated access points of the control network 20 which is used for setting up routes originating at that central office.

Resources are allocated in the telecommunications network 10 through use of a database which circulates around the ring-like control network 20. The database contains a substantially complete representation of the state of the network at any given time. The state of the network is defined as the number of busy trunks in each trunk group. The database has one record per trunk group, which record contains the current status of the particular trunk group. The format of each record is shown in FIG. 3 and is discussed in detail below.

For each call, the originating switching office initiates a call set up by sending a message to the control network. The call is assigned to a particular processor in the ring-like control network 20. This may be done through the use of a central controller, or by a local controller in a situation where the processors 70 are distributed in location, or particular processors 70 in the control network 20 may be dedicated to particular switching offices in the telecommunications network 10. In any case, there is a communications channel schematically represented by path 80 between particular central offices in the telecommunications network 10 and particular processors in the ring-like control network 20.

Each processor 70 handles one call set-up at a time. A list of possible paths for the call may be stored in the database itself, or in the particular processor 70, or may be sent to the processor 70 by the originating switching office. The processor executes the call set-up algorithm (to be discussed below) and selects the best call route for the call. As part of the call set-up algorithm, the database is up-dated with the decision, so that the database remains current. The processor then communicates its choice back to the originating switching office which physically sets up the connection in the telecommunications network 10. At call completion, a message is again sent to the database, in order to inform the database as to which trunks have been released. In this manner the database is always maintained consistent with the current state of the network.

As schematically indicated in FIG. 2, the database information circulates around the ring-like network 20, allowing each processor 70 to see the individual records in that database as they pass by. The records are shifted through the delay buffers 60 in each access point. A processor 70 reads the record as it enters the delay buffer and can write the records, as the record leaves the delay buffer. The intervening delay allows the processor time to execute call set-up algorithms and update the record before it is passed on. If more than one processor is associated with an access point, a local contention resolution scheme will have to be implemented, to enable all of the processors in an access point to read and write the same records. In this discussion, it is assumed that there is only one processor per access point.

The call set-up algorithm used by the processor 70 may be understood as follows. In setting-up a call, this algorithm first checks all of the possible routes at the same time, finds the most promising one to target, and then attempts to allocate that route. The algorithm takes advantage of the exact information on the network state contained in the database, the cyclic nature of the database, and the strict order in which records are seen by the processors comprising the ring-like control network 20. The cyclic nature of the database refers to the database circulating around the ring-like control network. The cycle time is the time one record takes to go around the ring. It is known to those skilled in the art, that network resources are more efficiently utilized when calls are carried over a direct route between the originating and terminating switching offices, as compared to multi-hop routes involving intermediate switching offices, as multi-hop calls have the potential to block a number of direct routes in the future. Accordingly, the call set-up algorithm of the present invention utilizes this heuristic rule by first trying to target a direct route and only then trying for a multi-hop route. FIG. 3 shows the record layout for a trunk group. There is one such record in the database for each trunk group in the telecommunications network. Each record contains a trunk group identification number, the number of trunks in the group, the number of trunks in use and also a queue of allocation requests used in setting up calls. When a processor has a record, it can enter a unique processor identification number (PID) into the queue, find out the position of its PID in the queue, or remove its PID from the queue. When a PID is removed from a queue, the queue automatically contracts, and the remaining PIDs will move toward the head of the queue. If the position of a processor's PID in the queue become less than the free capacity of the trunk group (free capacity equals the number of trunks in the group less the number of trunks in use), the processor will be allowed to obtain the trunk for a requested call.

The call set-up algorithm takes at most five cycles of the database to complete. In the first two cycles the processor attempts to allocate the direct route (if one exists). If the direct route cannot be obtained, the next two cycles are used to try from all of the possible routes. By the end of the fourth cycle, a decision will have been made as to whether to carry or block the call; and the route will have been allocated for a carried call. Finally, a fifth cycle may be required to clean up the database. Thus a processor 70 receiving a call set-up request from an associated switching office executes the following 5 cycle call set-up algorithm to provide a route to the central office.

Cycle 1: The processor enters its PID in the queue for the trunk group of the direct route. If its position is smaller than or equal to free capacity, the processor can allocate the direct route by incrementing the "number of trunks in use" field of the record and informing the central office. Otherwise, the processor waits for one cycle for the queue to collapse. (As used herein, one cycle means the time one record takes to travel once completely around the ring-like control network 20.)

Cycle 2: The processor observes whether its PID position in the queue of the record for the direct route is smaller than or equal to free capacity. If the PID position is smaller than free capacity, it can allocate the direct route. In any case, the processor removes its PID from the queue.

Cycle 3: The processor enters its PID in the queues for the trunk groups of all of the possible routes direct and the multi-hop, remembering its position in these queues. (Illustratively, this step may be limited by considering only direct and two-hop routes with one intermediate switching office, thus eliminating from consideration three or more hop routes.) At the end of the third cycle, the processor determines a target route involving one or more trunk groups in accordance with a formula described below.

Cycle 4: The processor removes its PID from the queues of all except the targeted trunk groups, and observes its position in the queues for the targeted trunk groups. The target route can be obtained if the processor's PID is within the free capacity for all of the trunks which make-up the target route. At this point, the switching office can be informed of the decision.

Cycle 5: The processor removes itself from all of the queues for the target route and allocates the trunks of the target route in the database if it has succeeded.

The target is the route the processor (call it processor N) is most likely to obtain. To determine the target route for processor N, the processor N calculates the probability that each possible route, direct and multi-hop (or in the more limited case direct and two-hop) will become available after one cycle around the ring network 20. The route with the largest probability of becoming available becomes the target route. In some cases it may be desirable to alter the outcome of the targeting the decision in order to give a higher "priority" to direct routes. Thus, the direct route may be targeted if its probability of becoming available is greater than a specific threshold (such as 0.9) regardless of the probabilities for the other routes.

The calculation of the route availability probability may be understood as follows. First, the probability that a particular trunk will become available to the particular processor N is calculated. The trunk availability probability P(c,f) is a function of c, the position of the processor's PID in the queue, and f, the free capacity of the trunk group (where free capacity is defined as the number of trunks in the trunk group minus the number of trunks in use.) Thus $$P(c,f) = \sum_{i=0}^{f-1}$$

probability of i PIDs remains in the queue ahead of the PID of processor N. The probability of i PIDs remaining ahead of the PID of processor N is $$\binom{c-1}{i} p^i (1-p)^{c-1-i}$$

where $$\binom{c-1}{i} = \frac{(c-1)!}{i!(c-1-i)!}$$

and p is the probability that a specific PID will remain in the cycle. It is estimated that p is given by the formula:

$$p = \frac{1}{\text{the average number of routes for a call in the telecommunications network}}$$

Thus if the average call has 10 possible routes p is 1/10. So, finally, the probability P(c,f) that a given trunk will become available to processor N is given by the formula $$P(c,f) = \sum_{i=0}^{f-1} \binom{c-1}{i} p^i (1-p)^{c-1-i}$$

The probability that a given route will become available is the product of the probability for each of the trunks which make up the route.

Thus, the foregoing algorithm works in a statistical manner. A processor N targets the route it is most likely to obtain in the next cycle, even though it does not yet know it will succeed. The algorithm is altruistic in that the processor N removes itself from the queues which are not in its target even though it has yet to obtain the target. However, the front of the target queues should collapse by the time processor N sees the record again on the next cycle. This is due to the fact that all of the processors ahead of processor N in the queue are also "upstream" of N and they execute the same altruistic algorithm as N. Thus, they also remove themselves from queues which are not of interest to them.

The action executed in each cycle by the processors are basically queue manipulation and increment/decrement functions. Hence, the call set-up algorithm could be implemented easily and efficiently.

Thus, there is disclosed herein control architecture for a telecommunications network which makes routing decision using a database containing substantially complete representation of the current state of the system.

In addition, as mentioned previously, no telecommunications network resources are allocated until a processor in the control network 20 has successfully found a route for a call. Thus, the contention for shared resources takes place in the control network 20 rather than in the telecommunications network 10, so as to reduce the amount of telecommunications resources held uselessly idle for calls that are ultimately blocked.

Finally, the above described embodiments of the invention are intended to be illustrative only. Numerous alternative embodiments may be devised by those skilled in the art, without departing from the spirit and scope of the following claims. In particular, while the control architecture has been described in connection with a particular telecommunications network, the architecture can be expected to prove useful in a variety of distributed resource allocation problems involving communication paths. In addition, the control architecture may run call set-up algorithms other than the one disclosed herein which is intended only as an example of a call set-up algorithm.

What is claimed is:

1. An information communications system comprising;
   a network including a plurality of switching nodes and a plurality of communications paths arranged in groups and interconnecting the switching nodes, and
   means in communication with said network for allocating routes in said network between particular switching nodes, said means maintaining a database containing a complete representation of the current number of busy communications paths in each group in said network and making available the contents of said database for all of said switching nodes, said means being adapted to receive route set-up requests from said network and to utilize said database to allocate preferred routes between particular pairs of said switching nodes, wherein said means comprises a ring-like network to circulate the contents of said database and wherein said ring-like network comprises a plurality of access points interspersed in the ring-like network, each access point comprising a processor.

2. The system of claim 1 wherein all of said access points are located in a single central location.

3. The system of claim 1 wherein said access points are distributed geographically, with particular access points being associated with particular ones of said switching nodes.

4. A system for controlling the setting-up of calls in a telecommunications network including a plurality of switching offices and a plurality of trunk groups interconnecting the switching offices, said system comprising,
   a control network including a plurality of access points arranged in a ring-like configuration, said control network maintaining a database which includes one record containing the current loading status of each of said trunk groups in said telecommunications network, said records circulating from access point-to-access point about said ring, each of said access points further including processor means for receiving call set up requests from one or more of said switching offices and for utilizing said circulating database to provide said one or more switching offices with call routes comprising one or more of said trunk groups in response to said requests, whereby contention for resources in said telecommunications network takes place in said control network and not in said telecommunications network.

5. A system for controlling route set-up in a network including a plurality of switching nodes and a plurality of communications paths arranged in groups and interconnecting the switching nodes, said system comprising
a plurality of processors arranged in a ringlike configuration around which a database containing a substantially exact representation of the current number of busy communication paths in each group circulates,
each of said processors being adapted to receive route set-up requests from one or more switching nodes and to utilize said database to allocate desired routes comprising one or more of said communications path groups to said switching nodes.

6. A method for setting up call routes between an originating switching office and a destination switching office in a telecommunications network comprising a plurality of switching offices and a plurality of trunk groups interconnecting the switching offices, said method comprising the steps of,
maintaining a database comprising a plurality of records, each record containing information as to the current loading status of one of said trunk groups,
determining with the aid of said database if a trunk group directly connecting said originating and destination switching offices is available,
if said direct route is unavailable, calculating the probabilities that said direct route and at least some two-hop routes between said originating and destination switching offices will become available within a predetermined time interval,
based on said probability calculating step, determining a target route between said originating office and said destination office,
determining, based on the records maintained in said database, if said target route is available, and
if said target route is available, communicating said target route to said originating switching office so that said originating switching office can set up said target route in said telecommunications network.

7. A method for setting up call routes in accordance with claim 6 further comprising the step of, if said target route is unavailable, blocking said call between said originating and destination switching offices.

8. A method for setting up call routes between an originating switching node and a destination switching node in a network comprising a plurality of switching nodes interconnected by communications paths in trunk groups, said method comprising the steps of
maintaining a database comprising a plurality of records, each record containing information as to the current free capacity of one of said trunk groups,
determining with the aid of said database if a communications path directly connecting said originating and destination switching nodes is available, if said direct route is unavailable, calculating the probability that said direct route and at least some two-hop routes between said originating and destination switching nodes will become available within a predetermined time interval to determine a target route between said originating and destination switching nodes, and determining, based on said data base, if said target route is available,
if said target route is available, communicating said target route to said originating switching node, and
if said target route is unavailable blocking said call.

9. The method claim of 8 wherein said maintaining step, includes the step of circulating said records in said database around a network comprising a plurality of processors arranged in a ring-like configuration.

10. The method of claim 9 wherein said first determining step comprises the step of writing a processor identification number into an allocation request queue maintained in said record for said direct communications path, and waiting at least one cycle time of said record in said database to determine whether said processor identification number is sufficiently close to the front of said queue so that said direct route may be allocated.

11. The method of claim 10 wherein, prior to said probability calculating step, said processor identification number is written into request allocation queues maintained in the records corresponding to the communications paths comprising said direct route and said two-hop routes, and after said probability calculating step removing said processor identification number from records corresponding to communications paths not forming part of said target route.

12. The method of claim 11 wherein said second determining step comprises determining whether said processor identification number is sufficiently close to the front of said allocation queues in the records corresponding to the communication paths of said targeted route, so that the targeted route may be allocated.

13. A control network for allocating routes in a telecommunications network including a plurality of switching offices and a plurality of trunk groups interconnecting the switching offices, said network comprising:
a group of processors arranged in a ring-like configuration for circulating a database comprising one record for each trunk group in said telecommunications network, each of said records including substantially current information as to the free capacity of the corresponding trunk group and a request allocation queue,
in accordance with a predetermined algorithm, each of said processors being capable of writing a processor identification number into a request allocation queue, determining the position of its identification number in a request allocation queue, and removing its identification number from a request allocation queue to set up routes between particular pairs of switching offices in said telecommunications network.

14. A method for setting up a connection route between an originating switching node and a destination switching node in a network comprising a plurality of switching nodes interconnected by communication paths arranged in groups, said method comprising the steps of:
maintaining a database containing a complete representation of the availability of communication paths in each of said groups,
utilizing said database to determine if a direct route between said originating switching node and said destination switching node is available,
if said direct route is not available, calculating the probabilities that said direct route and at least some two-hop routes will become available for said connection within a predetermined amount of time to determine a target route for said connection, and
utilizing said database to determine if said target route is available.

* * * * *